United States Patent Office 3,242,211
Patented Mar. 22, 1966

3,242,211
BIS-ALKYLIDENE HYDRAZODICARBOXYLIC DIHYDRAZIDES
Erhard P. Benzing, St. Louis, Mo., assignor to Monsanto Company, a corporation of Delaware
No Drawing. Filed Sept. 18, 1963, Ser. No. 309,859
4 Claims. (Cl. 260—554)

The invention is compounds of the formulas

R(R')C=NNHCONHNHCONHN=C(R')R and

wherein R is alkyl having not more than 8 carbon atoms, R' is the hydrogen atom or alkyl having not more than 8 carbon atoms, and $n$ is an integer from 3 to 11. This application is a continuation-in-part of copending application Serial No. 140,265, filed September 25, 1961, now U.S. Patent No. 3,171,857.

The dialkylidene hydrazodicarboxylic dihydrazides of the invention are useful as reducing agents. They also have similar uses to hydrazine. Unlike hydrazine the compounds of the invention are solid and more stable. They are useful as solid rocket propellants, since on oxidation large volumes of nitrogen as well as water are formed. Also the compounds of the invention are valuable intermediates with cites of reaction being the double bonds between the carbon and nitrogen atoms.

The compounds of the invention are obtained by reacting hydrazodicarboxylic acid-dihydrazide with ketones or aldehydes wherein two molecules of the carbonyl compound can be condensed with one molecule of hydrazodicarboxylic acid-dihydrazide. Derivatives of acetone, isobutyraldehyde, methylethylketone, diethylketone, diisopropylketone, di-t-butylketone, methyl-n-octylketone, n-butyraldehyde, isooctylaldehyde, cyclobutanone, cyclopentanone, cyclohexanone, cyclooctanone, cyclododecanone, etc., are formed very easily and practically quantitatively on mixing the reactants in warm water.

Example 1

7.5 g. of hydrazodicarboxylic acid-dimethylester (0.05 mole) and 10 g. of hydrazine hydrates (0.2 mole) are hated at 100° C. for ½ hour. Crystals separate on cooling and standing for some time. These are filtered off, washed with water and methyl alcohol and dried. Recrystallization from hot water gives pure hydrazodicarboxylic acid-dihydrazide. Yields 70%; M.P. 203–205° C.

*Analysis.*—$C_2H_8N_6O_2$ (148.1) percent C, calcd. 16.22, found 16.34; percent H, calcd. 5.44, found 5.41; percent N, calcd. 56.74, found 56.72.

Example 2

60.8 g. of hydrazine hydrate (1.2 moles) are dissolved in 130 ml. of ethyl alcohol. 81.6 g. of hydrazodicarboxylic acid-diphenylester (0.3 mole) are slowly added with stirring. The reaction mixture is subsequently refluxed for ½ hour, then cooled and the precipitated crystals filtered off.

Yield 40.4 g. (=91% of the theory); M.P. 203–205° C.

Hydrazodicarboxylic acid-dihydrazide is insoluble in most common solvents but soluble in hot water. The aqueous solution is weakly alkaline (pH 7–8). Two base-equivalents can be titrated with perchloric acid in acetic acid solution. The aqueous solution displays strong reducing properties.

Example 3

To a 10% solution of the hydrazide product of Example 1 in warm water a corresponding amount of acetone is added. Crystallization begins at once. The reaction mixture is kept at 50° C. for 15 minutes, then cooled and and filtered.

Yield 95%. Recrystallization from acetonitrile, M.P. 234–235° C. The product is $(CH_3)_2C=NNHCONHNHCONHN=C(CH_3)_2$ which is called bis-isopropylidene hydrazodicarboxylic dihydrazide.

*Analysis.*—$C_8H_{16}N_6O_2$ (228.3): percent C, calcd. 42.09, found 42.16; percent H, calcd. 7.07, found 7.31; percent N, calcd. 36.82, found 36.97.

Example 4

Isobutyraldehyde is used instead of acetone and one then proceeds as in Example 3.

Yield (crude) 100%. Recrystallization from DMF/water, M.P. 199–200° C. The product is $(CH_3)_2CHCH=NNHCONHNHCONHN$
                                  $=CHCH(CH_3)_2$ which is called bis-isobutylidene hydrazodicarboxylic dihydrazide.

*Analysis.*—$C_{10}H_{20}N_6O_2$ (256.3) percent C, calcd. 46.82, found 46.91; percent H, calcd. 7.87, found 7.98; percent N, calcd. 32.79, found 32.61.

Example 5

Cyclohexanone is used instead of acetone and one then proceeds as in Example 3. Yield of crude product is about 100%. This crude product can be purified by recrystallization in a similar manner as were the products of Examples 3 or 4. The product is

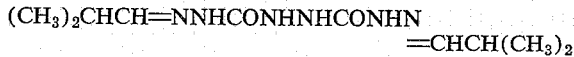

which is called bis-cyclohexylidene hydrazodicarboxylic dihydrazide.

What is claimed is:

1. A compound selected from the group consisting of compounds of the formulas

R(R')C=NNHCONHNHCONHN=C(R')R and

wherein R is alkyl having not more than 8 carbon atoms, R' is selected from the class consisting of the hydrogen atom and alkyl having not more than 8 carbon atoms, and $n$ is an integer from 3 to 11.

2. $(CH_3)_2C=NNHCONHNHCONHN=C(CH_3)_2$
3. $(CH_3)_2CHCH=NNHCONHNHCONHN$
                                  $=CHCH(CH_3)_2$
4.

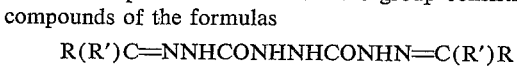

No references cited.

NICHOLAS S. RIZZO, *Primary Examiner.*